United States Patent [19]

Nagata

[11] 4,224,015
[45] Sep. 23, 1980

[54] POSITIVE DISPLACEMENT FLOW METER WITH HELICAL-TOOTHED ROTORS

[75] Inventor: Shigeyoshi Nagata, Tokyo, Japan

[73] Assignee: Oval Engineering Co., Ltd., Tokyo, Japan

[21] Appl. No.: 869,031

[22] Filed: Jan. 6, 1978

[30] Foreign Application Priority Data

Jan. 19, 1977 [JP] Japan .................................... 52-4019
Jul. 25, 1977 [JP] Japan .................................. 52-89056

[51] Int. Cl.³ .......................... G01F 3/10; F01C 1/16
[52] U.S. Cl. .................................... 418/150; 418/201; 73/261
[58] Field of Search ............... 418/201, 202, 203, 150; 73/261

[56] References Cited
U.S. PATENT DOCUMENTS

| | | | |
|---|---|---|---|
| 2,701,683 | 2/1955 | Whitfield | 418/201 |
| 3,414,189 | 12/1968 | Persson | 418/201 |

FOREIGN PATENT DOCUMENTS 934605 10/1955 Fed. Rep. of Germany .......... 418/201

*Primary Examiner*—John J. Vrablik
*Attorney, Agent, or Firm*—Michael J. Striker

[57] ABSTRACT

The present invention relates to a positive displacement flow meter having a pair of rotors to be rotatably engaged with each other which are provided with tooth profile curves of a cycloid and of a trochoid.

Since the tooth profile of one rotor is equal to that of the other rotor, transmission of energy between the two rotors is uniform, and wear of teeth of the two rotors being reduced.

4 Claims, 28 Drawing Figures

POSITIVE DISPLACEMENT FLOW METER WITH HELICAL-TOOTHED ROTORS

BACKGROUND OF THE INVENTION

Conventionally, a typical positive displacement flow meter has a pair of rotors, there are known a non-circle tooth-type flow meter, a Roots-type flow meter, a birotary-type flow meter and the like. The non-circle tooth-type flow meter (which is called a flow meter having the trademark "OVAL") has a relatively simple structure and a high performance as to output the disadvantage thereof is that the rotors are forced to be rotated with an unequal speed rotation so that it is unavoidable to prevent vibrating noises due to pulsation. Further, the disadvantage of the Roots-type flow meter is that because the rotor itself does not rotate uniformly, it is indispensable to employ a pilot gear, and subsequently a phase adjustment between a pilot gear and a rotor and the assembling work become more complicated. Consequently, the whole structure thereof also becomes complicated. Still further, the disadvantage of the birotary-type flow meter is that it is possible to prevent pulsation by selecting an appropriate twist angle (which is normally provided with a twist angle of 1.5 pitch at the tooth width), but it is unavoidable to employ a pilot gear just like in case of the above Roots-type flow meter. From the theoretical point of view, the birotary-type flow meter can transmit rotation without requiring a pilot gear, but the tooth profile is provided with the so-called second tooth profile so that its slippage is very big, and respective teeth are worn considerably by their mutual engagement. Accordingly, it is substantially indispensable to employ a pilot gear. Further, there exists the defect that the casing diameter is inconsistent occasionally, and the cutting work is troublesome and inefficient due to a different tooth profile curve of a pair of rotors.

The following references corresponding to the foregoing known art can be cited: U.S. Pat. Nos. 2,410,172, 2,243,874, 2,287,716, 1,821,523, 1,965,557, etc. Each cited reference has a pair of rotors to be engaged with each other, wherein the tooth profile of a first rotor is quite different from that of a second rotor. Consequently, transmission of energy between the two rotors is not uniform, and a stronger force of one rotor is applied to the other rotor. In view thereof, the vibration due to mutual engagement of the two rotors is large and it is impossible to avoid wear of teeth of the two rotors.

In order to remove the aforegoing defects of the conventional art, the present invention has been made.

BRIEF SUMMARY OF THE INVENTION

Accordingly, it is the primary object of this invention to provide a positive displacement flow meter which is provided with a pair of rotors of helical tooth structure to be engaged with each other, wherein an addendum of the tooth profile curve of a pair of rotors is provided with cycloid, and a deddendum of the same is provided with trochoid, and in which the pair of rotors have the same tooth profile.

It is another object of this invention to provide a positive displacement flow meter in which a pair of rotors are rotatable with an equal speed of rotation, and which is adaptable for a large-scale flow meter due to very small pulsation and vibrating noise.

It is another object of this invention to provide a positive displacement flow meter which is capable of improving the manufacture of rotors of helical tooth structure as well as reducing the manufacturing cost since each of a pair of rotors has the same tooth profile.

It is another object of this invention to provide a positive displacement flow meter in which the torque of a pair of rotors is always constant during its one revolution, and transmission of energy between the two rotors is mutually balanced.

It is another object of this invention to provide a positive displacement flow meter of high accuracy in which the cross section of a pair of rotors taken at a plane normal to the axes of the rotor is provided with the same tooth profile and the same number of teeth.

It is another object of this invention to provide a positive displacement flow meter in which a first tooth profile is formed by mounting an arc tooth profile of the slippage zero to a portion of a second tooth profile of a pair of rotors, and thereby a rotation of a pair of rotors to be engaged with each other being obtainable without using a pilot gear.

It is a further object of this invention to provide a positive displacement flow meter in which a locking means to enable to lock a pair of rotors with a tooth profile to be engageable adjacent a pitch circle of a pair of rotors so as to perform the function of a pilot gear, and thereby a very smooth rotation being obtainable with less friction and less vibration.

It is still a further object of this invention to provide a pair of rotors provided with a tooth profile curve of a cycloid and of a trochoid, which are applicable not only to a positive displacement flow meter, but also to a rotation pump, a motor and other various devices.

It is still a further object of this invention to provide a positive displacement flow meter, in which a convex tooth profile is provided at one (or two) portion(s), while the other portion thereof is recessed, thereby a pair of rotors being able to be rotated smoothly only by the convex tooth profile.

Other features and advantages of this invention will be apparent from the following description taken in connection with the accompanying drawings.

DETAILED DESCRIPTION OF THE INVENTION

Figure 1:
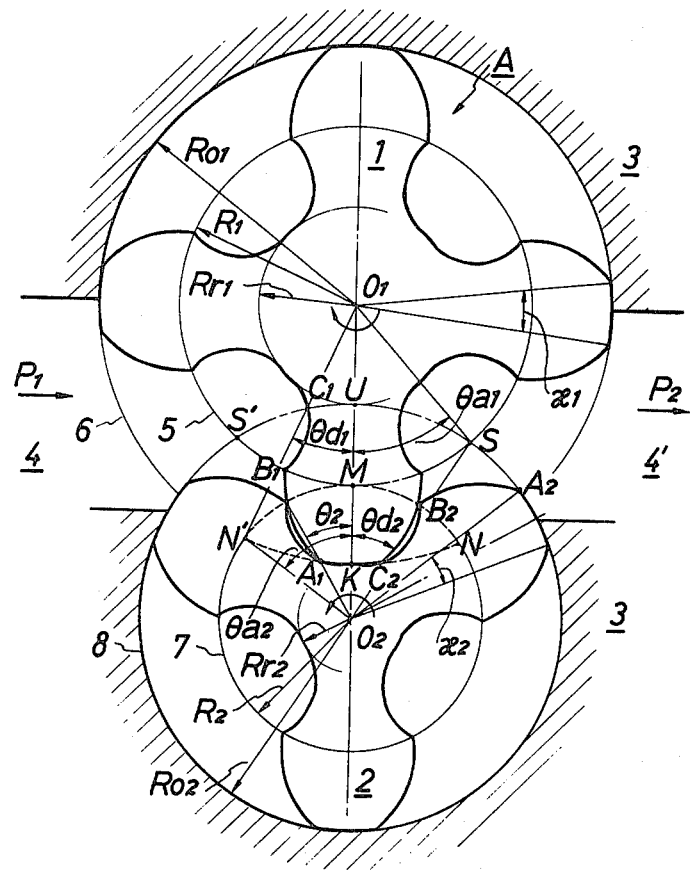
FIG. 1 is a section view of tooth profile curves of a pair of rotors taken in a plane normal to the axes of the rotors which illustrates an embodiment of a positive displacement flow meter according to this invention.

FIG. 1 illustrates a section view of a positive displacement flow meter taken in a plane normal to the axes of the rotors wherein a pair of helical teeth to be engaged with each other are provided with a first rotor 1 having four teeth and a second rotor 2 having three teeth. Under this structure a pair of rotors 1, 2 are rotatable freely in accordance with $P=P_1-P_2$ i.e. the liquid pressure difference toward a liquid flow outlet 4' from a flow inlet 4 installed in a casing 3. Numerals 5 and 6 designate respectively the pitch circle and the addendum circle of the rotor 1. Numerals 7 and 8 designate respectively the pitch circle and the addendum circle of the rotor 2. Numerals $0_1$ and $0_2$ are centers of the two rotors 1, 2. A pitch point is denoted at M.

The curves $A_1B_1$ and $A_2B_2$ are tooth profile curves which are formed at the addendum of the two rotors 1, 2 respectively, while the curves $B_1C_1$ and $B_2C_2$ are tooth profile curves which are formed at the deddendum of the two rotors 1, 2 respectively. In other words, by defining the pitch circles 5, 7 of the two rotors 1, 2 as a border, the tooth profile curves which are formed toward the addendum from the pitch circles 5, 7 correspond to the curves $A_1B_1$ and $A_2B_2$, while the tooth profile curves which are formed toward the deddendum from the pitch circles 5, 7 correspond to the curves $B_1C_1$ and $B_2C_2$.

The opposite section of these tooth profile curves is illustrated symmetrically just like in case of the section in FIG. 1, so that the description of the opposite section shall be omitted.

When a pair of rotors 1, 2 are engaged with each other due to rolling without slipping on the pitch circles 5, 7 an intersecting point $A_1$ between the addendum circle 6 of the first rotor 1 and the tooth profile curve thereof is engaged due to slipping along with the tooth surface of the dedendum of the second rotor 2. In other words, whereas the tooth profile curve of the dedendum of the second rotor 2 is a track on the rotor 2 at the point $A_1$, the tooth profile curve of the addendum of the rotor 1 is a track on the rotor 1 at the point $B_2$.

The points $A_1$ and $B_2$ become the intersecting points on the tooth profile curves of either of the rotors 1, 2, and further are positioned on the circumference of the addendum circle 6 of the first rotor 1 and on that of the pitch circle 7 of the second rotor 2. If the intersecting points of the two circles 6, 7 are denoted at N and N', and an intersecting point between the line connection axes of the both rotor 1, 2 and the addendum circle 6 is denoted at K, the track in relation of the intersecting points $A_1B_2$ with the static co-ordinates becomes two arcs i.e. NKN' and NMN', and subsequently the engagement of the two rotors 1, 2 is completely sealed along the helical teeth surfaces while maintaining contact on the teeth surfaces. In the same manner, concerning the point $B_1$ of the rotor 1 corresponding to the points $A_2$ and $B_2$ of the second rotor 2 corresponding to the point $A_1$, if the intersecting points between the addendum circle 8 of the second rotor 2 and the pitch circle 5 of the first rotor 1 are denoted at S and $S_1$, and if an intersecting point between the line connecting the both rotors 1, 2 axes, and the addendum circle 8 is denoted at U, as shown in the dotted line of FIG. 1 two arcs i.e. SUS' and SMS' are obtainable as a track of the static co-ordinates of the intersecting points $A_2$ and $B_1$.

When the two pitch circles 5, 7 are rolled and contacted together without slipping, the tooth profile curves $A_1B_1$ and $A_2B_2$ to be formed on the addendum of the two rotors 1, 2 shows the cycloid to be described by the points $B_2$ and $B_1$ on the pitch circle, while the tooth profile curves $B_1C_1$ and $B_2C_2$ to be formed on the dedendum of the two rotors 1, 2 show the trochoid to be described by the points $A_1$ and $A_2$ on the addendum circle.

Accordingly, whereas the points $B_1$ and $B_2$ are the contacting points contacting the cycloid $A_2B_2$ and $A_1B_1$, the points $A_1$ and $A_2$ are the contacting points contacting the trochoid $B_2C_2$ and $B_1C_1$.

In other words, it is to be understood that the tooth profile curves of a pair of rotors 1, 2 to be engaged with each other are in the form of a cycloid at the addendum and in the form of a trochoid at the dedendum with the points $B_1$ and $B_2$ on the pitch circle as the border.

The ends of the cycloid and of the trochoid to be positioned at the addendum and the tooth bottom of the two rotors 1, 2 are connected by arcs.

Accordingly, a pair of rotors 1, 2 can obtain the movement of engagement without conflicting with each other. The variations of engagement of a pair of rotors 1, 2 are illustrated in FIG. 2a to FIG. 2j.

As will be understood from FIG. 2a to FIG. 2j, the track to be described by the points $A_1A_2$ and $B_1B_2$ of the two rotors 1, 2 are provided with four arcs NKN', NMN', SUS' and SMS'.

Figure 10:
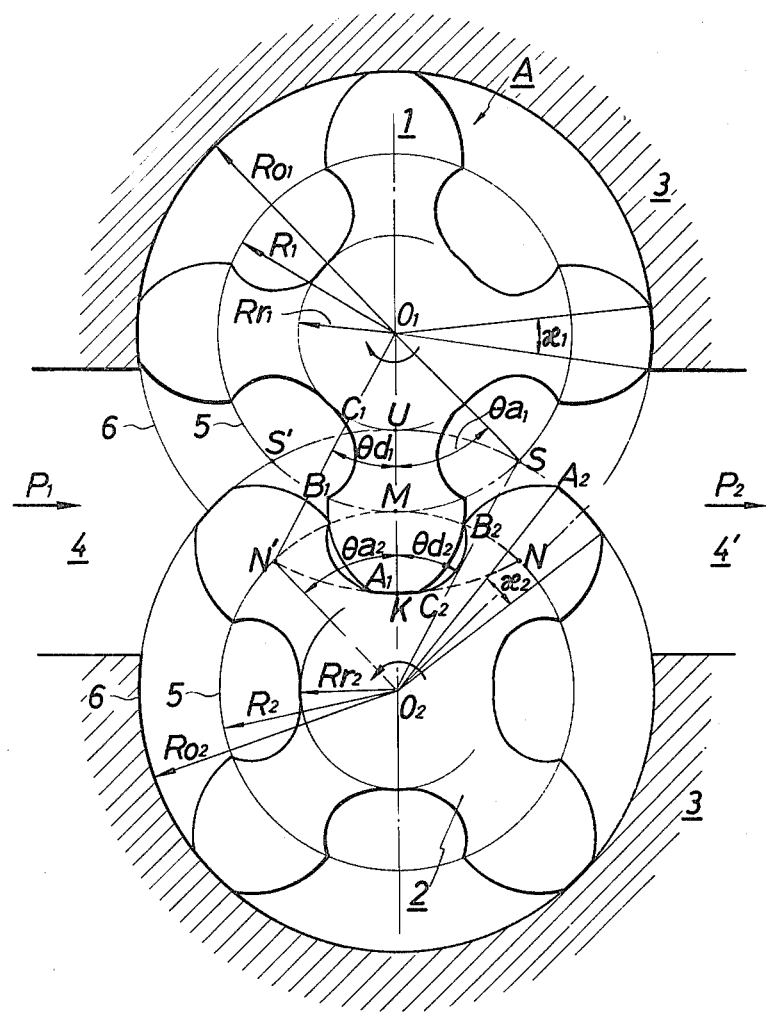
FIG. 10 is a section view of tooth profile curves of a pair of rotors having the same outer diameter and the same number of teeth according to another embodiment of this invention.

FIG. 10 illustrates an embodiment of the flow meter having two rotors made with the same number of teeth and with the same diameters. The entire description of the tooth profile curves depicted in FIG. 1 may be referred to FIG. 10.

The rotating torque of a flow meter A having a pair of rotors of the aforegoing structure will be described hereinafter from the theoretical point of view.

Now the torque $T_1$ of the first rotor 1 will be denoted as $Ta_1$ at the addendum and as $Td_1$ at the deddendum, and the radii of the respective contacting points will be denoted as $Ra_1$ and $Rd_1$. And a X-axis will be taken to an axial direction. Then, the following equations are obtained.

$$Ta_1 = \frac{P}{2} \int (Ro_1^2 - Ra_1^2)dx$$

$$Td_1 = \frac{P}{2} \int (R_1^2 - Rd_1^2)dx + \frac{P}{2} \int (Rd_1^2 - Rr_1^2)dx \quad (1)$$

Wherein
$Ro_1$: Radius of the addendum circle
$R_1$: Radius of the pitch circle
$Rr_1$: Radius of the tooth bottom circle.

In the same manner, the torque $T_2$ of the second rotor 2 will be denoted as $Ta_2$ at the addendum and as $Td_2$ at the dedendum, and the radii of the respective contacting points will be denoted as $Ra_2$ and $Rd_2$. Then, the following equations are obtained.

$$Ta_2 = \frac{P}{2} \int (Ro_2^2 - Ra_2^2)dx \quad \Bigg\} \quad (3)$$

$$Td_2 = \frac{P}{2} \int (R_2^2 - Rd_2^2)dx + \frac{P}{2} \int (Rd_2^2 - Rr_2^2)dx$$

Figure 3:
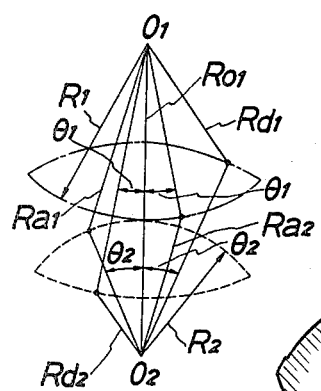
FIG. 3 illustrates the path of engagement points of a pair of rotor in FIG. 1.

Wherein
$Ro_2$: Radius of the addendum circle
$R_2$: Radius of the pitch circle
$Rr_2$: Radius of the tooth bottom circle On the basis of the track view of the contacting points of the rotors as shown in FIG. 3, the radii $Ra_1$, $Rd_1$, $Ra_2$ and $Rd_2$ of each contacting point are obtained by the following equations.

$$Ra_1^2 = R_1^2 + 2R_2(R_1 + R_2)(1 - \cos\theta_2)$$
$$Rd_1^2 = Rr_1^2 + 2R_{02}(R_1 + R_2)(1 - \cos\theta) \quad \Bigg\} \quad (3)$$
$$Ra_2^2 = R_2^2 + 2R_1(R_1 + R_2)(1 - \cos\theta)$$
$$Rd_2^2 = Rr_2^2 + 2R_{01}(R_1 + R_2)(1 - \cos\theta)$$

Since the respective tooth profile of a pair of rotors 1, 2 has a preferred twist angle $\beta$ to an axial direction of the rotors, by inserting the related equation $$dx = R_1 d\theta_1/tg\beta = R_2 d\theta_2/tg\beta$$

the foregoing equations (1) and (2) can be rewritten as follows.

$$T_1 = Ta_1 + Td_1 \quad (4)$$
$$= \frac{P}{2} \frac{R}{tg\beta} [\int\{(Ro_1^2 - R_1^2) - 2R_2(R_1 + R_2)(1 - \cos\theta_2)\}d\theta_2$$
$$-\int\{(R_1^2 - Rr_1^2) - 2R_{02}(R_1 + R_2)(1 - \cos\theta_2)\}d\theta_2$$
$$+\int 2R_{02}(R_1 + R_2)(1 - \cos\theta_2)d\theta_2]$$
$$T_2 = Ta_2 + Td_2 \quad (5)$$
$$= \frac{P}{2} \frac{R_1}{tg\beta} [\int\{(Ro_2^2 - R_2^2) - 2R_1(R_1 + R_2)(1 - \cos\theta)\}d\theta_1$$
$$-\int\{(R_2^2 - Rr_2^2) - 2R_{01}(R_1 + R_2)(1 - \cos\theta)\}d\theta_1$$
$$+\int 2R_{01}(R_1 + R_2)(1 - \cos\theta)d\theta_1]$$

When integrating the foregoing equations (4) and (5) by defining the integral calculus of each rotation angle, the rotating torque in each engagement position is obtained, but the torque is generally variable.

The twist angle $\beta$ is to be twisted so as to be multiplied by a certain integral number at the length L of each rotor. In other words, the tooth surface of the front end of the rotors 1, 2 respectively and that of the rear end thereof are to be positioned so as to be twisted by maintaining a certain integral number of the pitch, wherein the number of teeth of the rotors 1, 2 respectively will be $Z_1$, $Z_2$, and the positive integral number will be i. Then, the following relation is obtained.

$$L = iR_1 \frac{2\pi}{Z_1}/tg\beta = iR_2 \frac{2\pi}{Z_2}/tg\beta \quad (6)$$

Further, when the foregoing equation (6) will be integrated by each rotation angle of the two rotors 1, 2, the following equations is obtained.

$$T_1 = \frac{P}{2} \frac{R_2}{tg\beta} i \Bigg[ (Ro_1^2 - R_1^2)\frac{\pi}{Z} + 2 \int_0^{\theta A_2}(Ro_1^2 - Ra_1^2)d\theta_2 \quad (7)$$
$$- \int_0^{\theta d_2}(R_1^2 - Rd_1^2)d\theta_2 - \int_{H_2}^{\theta d_2}(R_1^2 - Rd_1^2)d\theta_2 + (Rd_1^2 - Rr_1^2)d\theta_2$$
$$= \frac{P}{2} \frac{R_2}{tg\beta} i \Bigg[ (Ro_1^2 - R_1^2)\frac{\pi}{Z_2} + 2\theta A_2) - 4R_2(R_1 + R_2)$$
$$(\theta a_2 - \sin\theta a_2) - (R_1^2 - Rr^2)(2\theta d_2 - H_2) + 4Ro_2(R_1 - R_2)$$
$$(\theta d_2 - \sin\theta d_2) \Bigg]$$
$$= \frac{P}{2} L \frac{Z_1}{\pi}(Ro_1^2 - R_1^2)(\frac{\pi}{2Z_2} + \theta a_2) - (R_1^2 - Rr_1^2)(\theta d_2 - \frac{H_2}{2})$$
$$- 2R_2)(R_1 - R_2)(\theta a_2 - \sin\theta a_2) + 2Ro_2(R_1 + R_2)(\theta d_2 - \sin\theta d_2)]$$

At the same time, the following equation is obtained.

$$T_2 = \frac{P}{2} L \frac{Z_1}{\pi} \Bigg[ (Ro_2^2 - R_2^2)(\frac{\pi}{2Z_1} + \theta a_1) - \quad (8)$$
$$(R_2^2 - Rr_2^2)(\theta d_1 - \frac{H_1}{2}) - 2R_1)(R_1 + R_2)(\theta a_1 - \sin\theta a_1) +$$
$$2Ro_1(R_1 + R_2)(\theta d_1 - \sin\theta d_1)$$

All the numerical values of the foregoing equations (7) and (8) show respectively a certain constant value, and no variable quantity is included.

Accordingly, the followings are constant.

$T_1 = K_1$ (constant)

$T_2 = K_2$ (constant)

Further, when the sectional profiles of a pair of rotors 1, 2 taken at an axially right angle are identified with each other, the following relations are obtained in accordance with the foregoing equations.

$Z_1 = Z_2 = Z$ $Ro_1 = Ro_2 = Ro$ $R_1 = R_2 = R$ $Rr_1 = Rr_2 = Rr$ $\theta a_1 = \theta a_2 = \theta a$ $\theta d_1 = \theta d_2 = \theta d$ $H_1 = H_2 = H$ $$T_1 = T_2 = \frac{P}{2} L \frac{Z}{\pi} (R_{o2} - R_2) \left(\frac{\pi}{2Z} + \theta a\right) - \qquad (9)$$

$$(R^2 - Rr^2)(\theta d - \frac{H}{2}) - 4R^2(\theta a - \mathrm{Sin}\theta a) + 4R_oR(\theta d - \mathrm{Sin}\theta d)$$

Accordingly, the following is obtained.

$T_1 = T_2 = K$ (constant)

In order that a pair of rotors 1, 2 are always rotatable with an equal speed without pulsation, it is required to gain the condition that the sum of the torques $T_1$ and $T_2$ of the two rotors 1, 2 is fixed.

And, the difference between the two rotating torques $T_1$ and $T_2$ expresses the transmission of energy during the rotation of a pair of rotors 1, 2. Then, the following cases will be explained.

(i) In case of $T_1 - T_2 > 0$
   This case shows that the first rotor 1 as the main drive rotates the second rotor 2.
(ii) In case of $T_1 - T_2 < 0$
   This case shows that the second rotor 2 as the main drive rotates the first rotor 1.
(iii) In case of $T_1 - T_2 = 0$ i.e. $T_1 = T_2$
   This case shows that the two rotors are rotated by themselves, so that the superficial pressure of the contacting point is zero.

Accordingly, when the sum of the torques $T_1$ and $T_2$ of a pair of rotors 1, 2 is fixed, and $T_1 = T_2$ is obtainable, an ideal positive displacement flow meter is established.

From the foregoing viewpoints, the equations (7), (8) and (9) will be studied.

(I) In case of $L \neq iR(2\pi/Z)/tg\beta$
   Either $T_1$ or $T_2$ is not fixed, and the sum of them and the difference between them are not fixed.
(II) In case of $L = iR(2\pi/Z)/tg\beta$
   Either $T_1$ or $T_2$ is fixed, and the sum of them and the difference between them are fixed. However, when the number of teeth of the first rotor 1 is not equal to that of the second rotor 2, the difference between $T_1$ and $T_2$ does not become zero. But when the number of teeth of the former is equal to that of the latter, as shown in FIG. 10, the difference between $T_1$ and $T_2$ becomes zero whereby an ideal positive displacement flow meter is established. When the twist angle $\beta$ is not multiplied by a certain integral number of pitch and the phase of the front and rear tooth surface of the rotor is slipped just by ½, pursuant to $L = (i + 0.5)R(2\pi/Z)/tg\beta$ the torques $T_1$ and $T_2$ of the two rotors 1, 2 are not constant and the difference between them is not constant, and only the sum of them is constant.

Under the foregoing circumstances the present invention can provide a positive displacement flow meter having a pair of rotors of helical tooth structure in which the addendum is provided with a cycloid and the deddendum is provided with a trochoid. Further, when the twist angle $\beta$ is of the pitch to be multiplied by a certain integral number at the gear width, and the sectional profile of the first rotor 1 taken at an axially right angle has the same shape as that of the second rotor taken in the same manner, an ideal positive displacement flow meter is established.

Although the tooth profile contacting point of such a positive displacement flow meter has a zero pressure of the tooth surface, since the engagement is secondary one the slippage is big and under a slight load there is the danger of wear. Thus, it is required to employ a pilot gear practically, consequently the whole structure becoming complicated. In addition, there are many difficulties in view of assembling and combination of the pilot gear and the rotors as well.

Figure 4A:
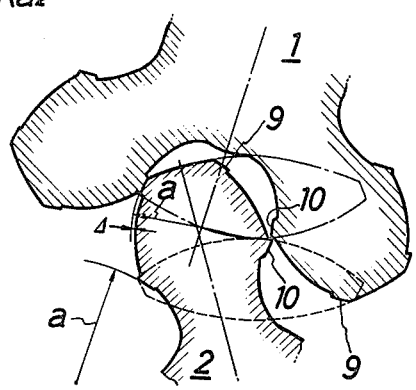
FIG. 4a illustrates a tooth profile structure of engagement of a pair of rotors showing another embodiment of a positive displacement flow meter according to this invention.

One of the most advantageous features of this invention is to remove a pilot gear which is required for the positive displacement flow meter. Its detailed examples are shown in FIGS. 4a and 4b.

That is, a first tooth profile is formed at respective portions of the cycloid tooth profile provided on the addendum of a pair of rotors as well as of the trochoid tooth profile provided on the dedendum. In addition, two convex respectively concave arc tooth profiles 9, 10 in the form of short circular segments of the slippage zero are formed as shown in FIG. 4a.

At the section of a pair of rotors taken at right angle to the axes of the rotors, the convex arc tooth profile 9 is formed at the position of the addendum of the cycloid by defining the pitch circle of a pair of rotors 1, 2 as the border, while the other convex arc tooth profile 10 is formed at the position of the pitch circle of the trochoid by defining the pitch circle as the border. And the cycloid and trochoid portion excluding the above convex arc tooth profile 9, 10 is formed concavely, i.e. maintained in a non-contact position by providing a slight projection Δ.

Figure 4B:
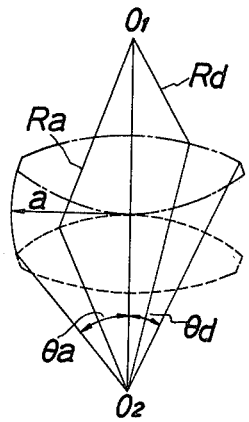
FIG. 4b illustrates the path of engagement of a pair of rotors in FIG. 4.
Figure 2A:
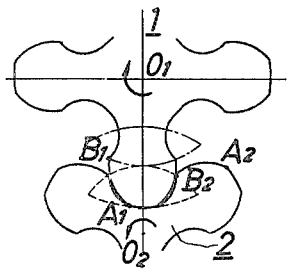
FIG. 2a to FIG. 2j illustrate variations of rotation in mutual engagement of a pair of rotors in FIG. 1.
Figure 2B:
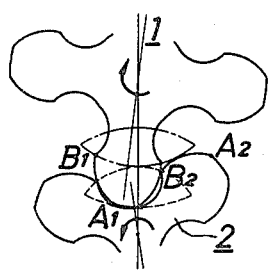
Figure 2C:
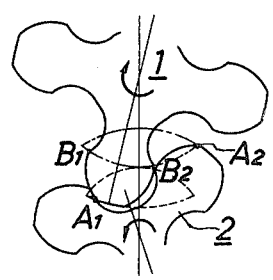
Figure 2D:
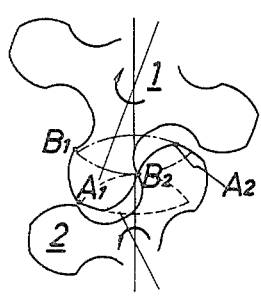
Figure 2E:
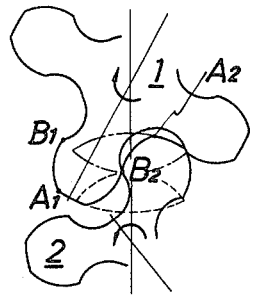
Figure 2F:
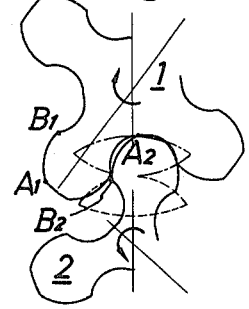
Figure 2G:
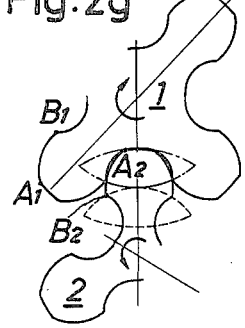
Figure 2H:
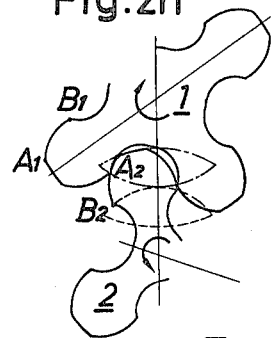
Figure 2I:
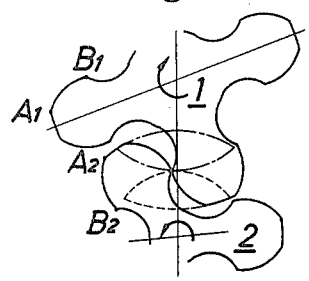
Figure 2J:
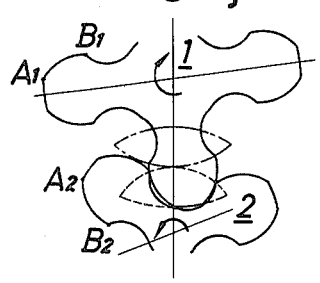

Only at both side ends of the track view of the contacting points in FIG. 4b i.e. at the position corresponding to the length of the arc tooth profiles 9, 10, the two rotors 1, 2 are engageable with each other and rotatable under the condition of the so-called zero slippage. Accordingly, without using a pilot gear an ideal flow measurement is obtainable by employing this positive displacement flow meter.

Preferably, the projection Δ of the convex arc tooth profiles 9, 10 is very slight, so that there takes place a gap of only 2Δ. However, it is possible to maintain a constantly fixed gap rather than to adjust the gap between the convex teeth profiles 9, 10 by means of a pilot gear. Accordingly, the device according to the present invention can maintain stability.

Since the positive displacement flow meter according to this invention has a pair of rotors of helical tooth structure in which the tooth profile curves of cycloid and trochoid are provided with the arc tooth profiles 9, 10, it is of simple structure as well as of a very small pulsation and vibrating noise owing to equal speed rotation. Further, it it an ideal product having no energy transmission between the two rotors.

Figure 5:
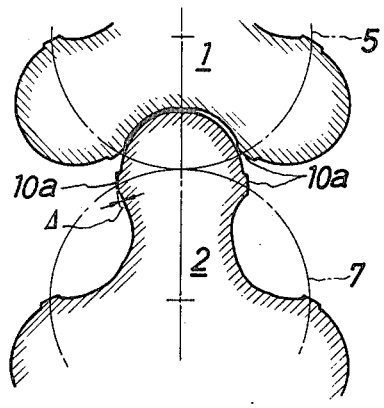
FIG. 5 illustrates a tooth profile structure showing another embodiment of a pair of rotors.

Referring to FIG. 5, a convex arc tooth profile 10a is formed with a slight projection Δ at the position of mutual engagement (as shown in FIG. 4a) of a pair of arc tooth profiles 9, 10. The other portion excluding the convex arc tooth profile 10a is recessed in a non-contact position.

The convex arc tooth profile 10a is applicable not only to the tooth profile curve of the present embodiment as well as of the other embodiment mentioned below, but also to all helical teeth including an involute curve, a cycloid curve, a trochoid curve, a circle envelope, an arc tooth profile and/or other artificial curves.

Needless to say, at the recessed portion arises a slight gap which may cause leakage of liquid. This gap is however smaller than the one that is necessary for a phase adjustment between a rotor and a pilot gear in a Roots-type flow meter or the like. Accordingly, such a slight gap constitutes actually no drawback at all. Conversely, the gap dimension can always be stabilized.

Figure 6:
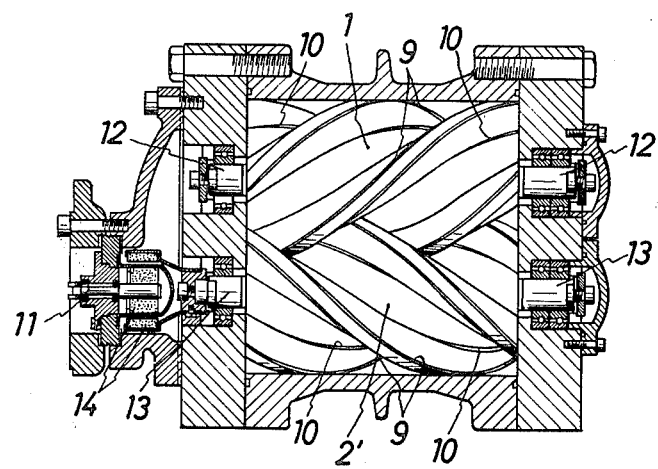
FIG. 6 is a section view of the detailed structure of a positive displacement flow meter according to this invention.

FIG. 6 is a section view of the positive displacement flow meter having a pair of rotors 1, 2 each of which has the same number of teeth, and has tooth profiles as shown in FIG. 4. Numeral 11 is an output shaft and numerals 12, 13 are rotation shafts. Numeral 14 is a magnet coupling.

Figure 7A:
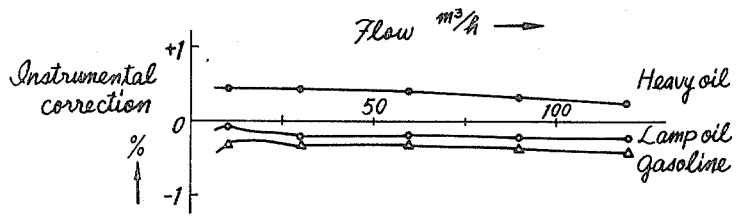
FIG. 7a shows the condition of instrumental correction of a positive displacement flow meter according to this invention.
Figure 7B:
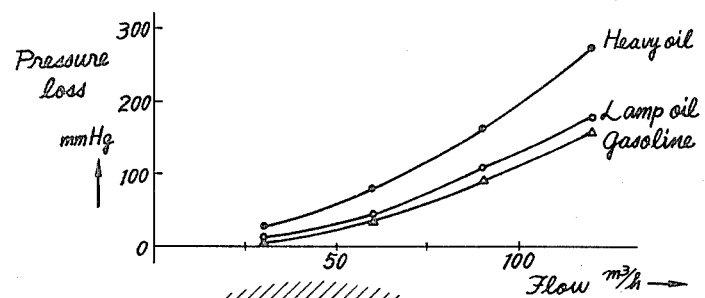
FIG. 7b is a graph showing the pressure loss in a positive displacement flow meter according to this invention.

FIG. 7a shows the condition of instrumental correction of the positive displacement flow meter and FIG. 7b is a graph showing the pressure loss therein.

As shown in FIG. 7a, change of instrumental correction is very small. Additionally, a preferred curve is obtainable in relation of the pressure loss with the flow.

Now I will compare the noise of the above positive displacement flow meter with that of a non-circle tooth type flowmeter of the same type. While that of the former has 75 decibles at the time of the maximum flow, that of the latter has 90 to 92 decibles. Accordingly, the former is superior to the latter in view of the noise prevention.

Another embodiment of the present invention will now be described in reference to the accompanying drawings FIGS. 8 and 9.

Figure 8:
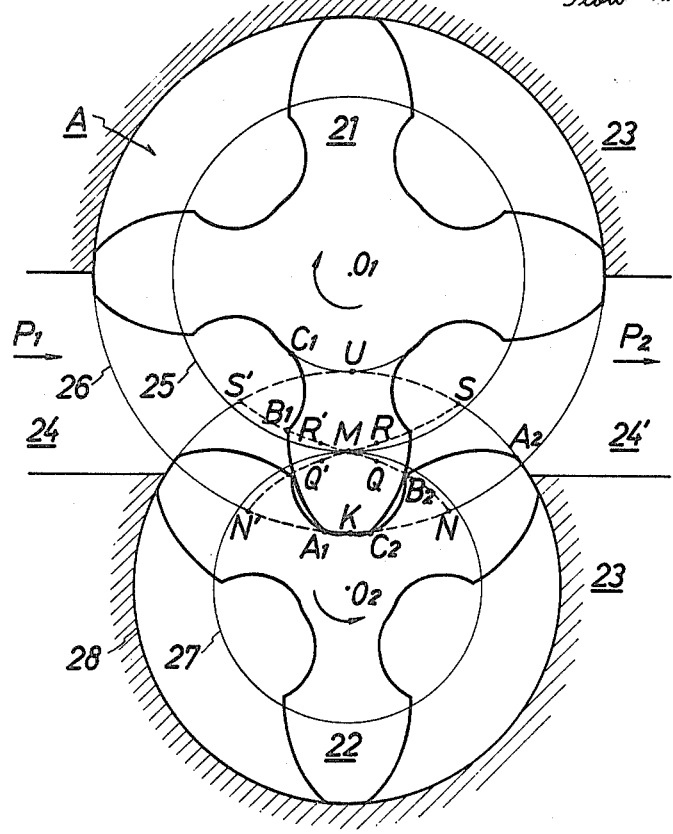
FIG. 8 is a section view of tooth profile curves of a pair of rotors taken at an axially right angle which illustrates another embodiment of a positive displacement flow meter according this invention.
Figure 9A:
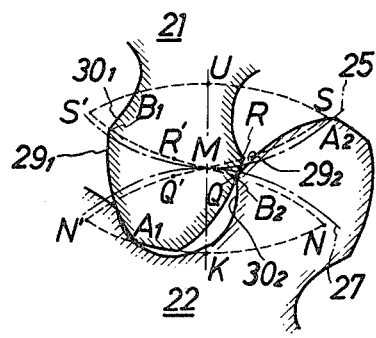
FIG. 9a to FIG. 9h illustrate variations of rotation in mutual engagement of a pair of rotors in FIG. 8.
Figure 9B:
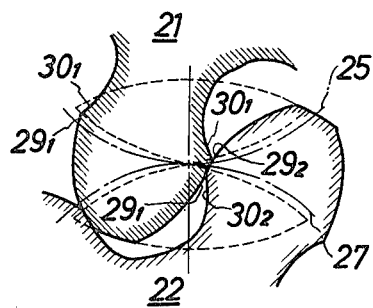
Figure 9C:
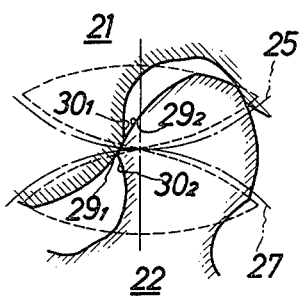
Figure 9D:
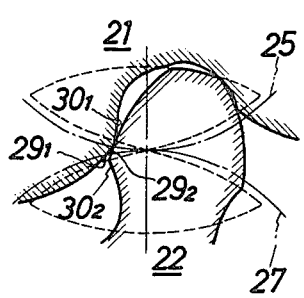
Figure 9E:
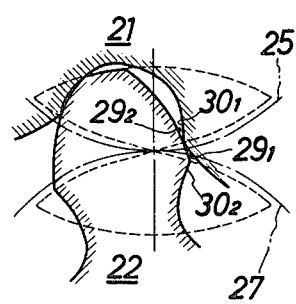
Figure 9F:
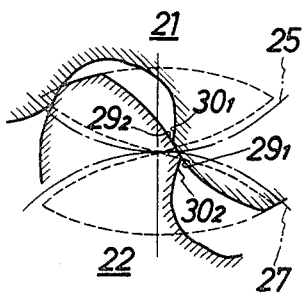
Figure 9G:
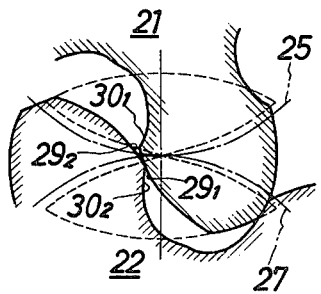
Figure 9H:
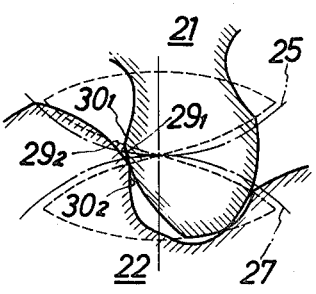

Just like FIG. 1, FIG. 8 is a section view of tooth profile curves taken at right angle to the axes of the rotors, which illustrates another embodiment of a positive displacement flow meter according to this invention. Whereas the first rotor 21 has four teeth, the second rotors 22 has three teeth. In this structure, from the liquid flow inlet 24 installed in a casing 23 toward the liquid flow outlet 24' a pair of rotors 21, 22 are rotatable freely in accordance with the pressure difference of liquid i.e. $P=P_1-P_2$. Numerals 25, 26 are a pitch circle and an addendum circle respectively of the rotor 21, while numerals 27, 28 are a pitch circle and an addendum circle respectively of the rotor 22. The respective centers of the pitch circles of the two rotors are denoted at $0_1$ and $0_2$. The pitch point is denoted at M.

By defining the pitch circles 25, 27 as the border, an addendum is provided with the tooth profile curves $A_1B_1$ and $A_2B_2$, while a dedendum is provided with the tooth profile curves $B_1C_1$ and $B_2C_2$. The detail view of the tooth profile curves of the two rotors is illustrated in FIG. 1. The curves $29_130_1$ and $29_230_2$ are provided with an engaging tooth profile curve like, e.g. an involute curve in which an addendum and a dedendum from the points $B_1B_2$ remote from the pitch circles 25, 27 of the two rotors 21, 22. On the section taken to the axes right angle a pair of rotors are contacted with each other on the points, but maintain a linear contact along an axial direction.

Both rotors, 21, 22 engage with each other along tracks QMR' and RMQ' shown with a x-shaped dotted line having the center M at the pitch point.

The track for the static co-ordinates on which the intersecting points $A_1A_2$ of the tooth profile curves of the two rotors 21, 22 provided with the addendum adjacent the addendum circles 26, 28 are contacting with each other, is SUS' and NKN' as shown in the dotted line of FIG. 8. Further, the track of the remaining static co-ordinates which the points $B_1B_2$ contact is shown with each arc of R'S', SR, Q'N', NQ. Due to these contacting points of a pair of rotors the screwed tooth surface is completely sealed.

Thus, just like the embodiment in FIG. 1, a pair of rotors 21, 22 are firmly engaged with each other, thereby a positive displacement flow meter having a high wear resistance being obtained.

In addition, the pair of rotors 21, 22 are engaged together with no interference with each other. The variations of mutual engagement of the two rotors 21, 22 are shown in FIG. 9a to FIG. 9h.

It is to be understood obviously that the tracks to be described by the points $A_1A_2$ and $B_1B_2$ of the two rotors consist of six arcs i.e. SUS', NKN', SR, R'S', NQ and Q'N' which include the track of x-shape as described above, as well as of four straight lines RM, MR'. QM, MQ'.

According to this invention, since the tooth form curves for engagement to be provided with e.g. an involute curve are provided in the proximity of the pitch circles of the two rotors, the danger of wear can be eliminated although there is the disadvantage that an impure matter in the liquid to be measured may be engaged in rotation. Further, one of many remarkable advantages is that a pair of rotors are firmly engaged with each other because of maintaining a x-shape contact to an axial direction in spite of the point contact at the section taken at an axially right angle. Accordingly, it is substantially feasible to remove a so-called pilot gear.

What is claimed is:

1. A positive displacement flow meter having a pair of rotors of helical tooth structure to be engageable with each other, wherein the opposite flanks of each tooth have in a section normal to the rotor axes at the addendum the form of a cycloid and at the dedendum the form of a trochoid, and wherein each of said flanks has at the addendum a convexly curved projection extending a small distance radially inwardly of the addendum circle thereof and at the dedendum a convexly curved projection extending a short distance radially inwardly of the pitch circle, said rotors engaging each other during their rotation only at said projections.

2. A positive displacement flow meter having a pair of rotors having helical teeth engaging each other in a plane normal to the axes of said rotors, said rotors having the same outer diameters and the same number of teeth respectively inclined to said axes at an angle $\beta$, and in which $L=i\times(2R\pi/Z)/\tan \beta$, wherein L=the axial length of each rotor, i is an integral number, R the outer radius of each rotor and Z the number of teeth in each rotor.

3. A positive displacement flow meter as defined in claim 2, wherein the number of teeth in each rotor is four.

4. A positive displacement flow meter as defined in claim 3, wherein i is equal to two.

* * * * *

UNITED STATES PATENT AND TRADEMARK OFFICE
CERTIFICATE OF CORRECTION

PATENT NO. : 4,224,015
DATED : September 23, 1980
INVENTOR(S) : Shigeyoshi Nagata It is certified that error appears in the above–identified patent and that said Letters Patent are hereby corrected as shown below:

At every occurrence of the expression "Roots-type flow meter", change the expression "Roots-type flow meter" to read -- flow meter normally characterized as being a rotary positive displacement flow meter which is called a flow meter having the trademark "ROOTS" --.

Signed and Sealed this

Fourth Day of May 1982

[SEAL]

Attest:

Attesting Officer

GERALD J. MOSSINGHOFF

Commissioner of Patents and Trademarks